(12) United States Patent
Fujiwara et al.

(10) Patent No.: US 11,984,782 B2
(45) Date of Patent: May 14, 2024

(54) STATOR COIL AND STATOR COMPRISING SAID STATOR COIL, ROTATING ELECTRICAL MACHINE, AND MANUFACTURING METHOD FOR STATOR COIL

(71) Applicant: Mitsubishi Electric Corporation, Tokyo (JP)

(72) Inventors: Takashi Fujiwara, Tokyo (JP); Makoto Tsukiji, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 170 days.

(21) Appl. No.: 17/608,289

(22) PCT Filed: May 22, 2019

(86) PCT No.: PCT/JP2019/020266
§ 371 (c)(1),
(2) Date: Nov. 2, 2021

(87) PCT Pub. No.: WO2020/235045
PCT Pub. Date: Nov. 26, 2020

(65) Prior Publication Data
US 2022/0209610 A1  Jun. 30, 2022

(51) Int. Cl.
*H02K 3/40* (2006.01)
*H02K 15/10* (2006.01)

(52) U.S. Cl.
CPC ............. *H02K 3/40* (2013.01); *H02K 15/105* (2013.01)

(58) Field of Classification Search
CPC .. H02K 3/40; H02K 3/32; H02K 3/30; H02K 15/105; H02K 15/10
(Continued)

(56) References Cited

U.S. PATENT DOCUMENTS 6,420,812 B1 * 7/2002 Emery .................... H02K 3/40
310/196
6,498,415 B1 * 12/2002 Emery .................... H02K 3/40
310/195
(Continued)

FOREIGN PATENT DOCUMENTS

| JP | S5574331 A | 6/1980 |
| JP | H0197148 A | 4/1989 |

(Continued)

OTHER PUBLICATIONS

Machine translation of JP-H0226356-U. (Year: 1990).*
(Continued)

*Primary Examiner* — Michael Andrews
(74) *Attorney, Agent, or Firm* — BUCHANAN INGERSOLL & ROONEY PC

(57) ABSTRACT

An object is to provide a stator coil having a corner portion with less start points for partial discharge while reducing loss. A stator coil having a conductor bar includes, at a corner portion thereof: a first insulating layer covering an outer periphery of the conductor bar; an electric conductor having one end electrically connected to the conductor bar on a distal end side of the corner portion, and another end placed on an outer surface of the first insulating layer; a first conductive layer covering an outer periphery of the first insulating layer and the electric conductor located on the outer surface of the first insulating layer; a second insulating layer covering an outer periphery of the first conductive layer; and a second conductive layer covering an outer periphery of the second insulating layer.

8 Claims, 4 Drawing Sheets

(58) Field of Classification Search
USPC .......................................................... 310/196
See application file for complete search history.

(56) References Cited

U.S. PATENT DOCUMENTS

| | | | |
|---|---|---|---|
| 8,395,296 B2 | 3/2013 | Emery | |
| 2009/0078450 A1* | 3/2009 | Miller | C09J 7/21 |
| | | | 174/209 |
| 2011/0062816 A1* | 3/2011 | Emery | H02K 3/40 |
| | | | 310/196 |

FOREIGN PATENT DOCUMENTS

| | | | | |
|---|---|---|---|---|
| JP | H0226356 U | * | 2/1990 | ............... H02K 3/40 |
| JP | H0226356 U | | 2/1990 | |
| JP | H04236143 A | | 8/1992 | |
| JP | H11262208 A | | 9/1999 | |
| JP | 2000060047 A | | 2/2000 | |
| JP | 2004048831 A | | 2/2004 | |
| JP | 2010028943 A | | 2/2010 | |
| JP | 2013505699 A | | 2/2013 | |

OTHER PUBLICATIONS

International Search Report (PCT/ISA/210) with translation and Written Opinion (PCT/ISA/237) dated Jun. 25, 2019, by the Japan Patent Office as the International Searching Authority for International Application No. PCT/JP2019/020266.

* cited by examiner

STATOR COIL AND STATOR COMPRISING SAID STATOR COIL, ROTATING ELECTRICAL MACHINE, AND MANUFACTURING METHOD FOR STATOR COIL

TECHNICAL FIELD

The present disclosure relates to a stator coil, a stator including the stator coil, a rotating electrical machine, and a manufacturing method for the stator coil.

BACKGROUND ART

A rotating electrical machine such as a turbine electric generator is composed of a rotor for generating a rotating magnetic field, and an annular stator provided on the outer circumferential side of the rotor. The stator is composed of a stator core having slots arranged in a circumferential shape and a stator coil inserted into the slots. In the rotating electrical machine, induced current is generated in the stator coil by the rotating magnetic field from the rotor. The stator coil is formed by a straight part inserted into the slot of the stator core and a part exposed to the outside in the axial direction from the stator core and bent outward in the radial direction, and is wound back at an end. Hereinafter, the straight part of the stator coil that is inserted into the slot is referred to as a slot portion, the part exposed to the outside in the axial direction from the stator core and extending outward in the radial direction is referred to as a coil end portion, and the bent part connecting the slot portion and the coil end portion is referred to as a corner portion.

The stator coil is composed of a conductor bar formed by bundling strands of copper or the like, and an insulating layer coating the outer part of the conductor bar. The insulating layer is often formed by winding a mica tape, and if there is a gap in the insulating layer, the gap becomes an electrically weak part so that partial discharge might occur. In particular, since the corner portion of the stator coil is bent, a gap is likely to be formed between the insulating layer and the conductor bar, and thus there is a problem that partial discharge is likely to occur.

As a conventional stator coil for coping with the above problem, disclosed is a stator coil in which a laminated tape having a two-layer structure composed of an insulating layer and a conductive layer is wound around a conductor bar with the insulating layer placed on the inner side, an exposed part of the conductor bar at the corner portion and the conductive layer of the laminated tape are electrically connected via an electric conductor, and a principal insulating layer is further provided around the outer periphery of the laminated tape and the electric conductor (see, for example, Patent Document 1).

CITATION LIST

Patent Document

Patent Document 1: Japanese Laid-Open Patent Publication (translation of PCT application) No. 2013-505699

SUMMARY OF THE INVENTION

Problems to be Solved by the Invention

In the conventional stator coil, since the conductor bar and the conductive layer of the laminated tape are electrically connected via the electric conductor, occurrence of partial discharge at the corner portion can be inhibited. However, since the laminated tape having the two-layer structure composed of the insulating layer and the conductive layer is used, the conductive layer helically covers the periphery of the conductor bar, and charge current flows through a helical current path, thus increasing loss. In addition, a gap is likely to be formed at an edge part of the electric conductor, and therefore this part might become a start point for partial discharge.

The present disclosure has been made to solve the above problem, and an object of the present disclosure is to provide a stator coil having a corner portion with less start points for partial discharge while reducing loss.

Solution to the Problems

A stator coil according to the present disclosure is a stator coil having a conductor bar, the stator coil including, at a corner portion thereof: a first insulating layer covering an outer periphery of the conductor bar; an electric conductor having one distal end electrically connected to the conductor bar on a distal end side of the corner portion, and another distal end placed on an outer surface of the first insulating layer; a first conductive layer covering an outer periphery of the first insulating layer and the electric conductor located on the outer surface of the first insulating layer; a second insulating layer covering an outer periphery of the first conductive layer; and a second conductive layer covering an outer periphery of the second insulating layer.

Effect of the Invention

The stator coil according to the present disclosure includes the electric conductor having one distal end electrically connected to the conductor bar on the distal end side of the corner portion and another distal end placed on the outer surface of the first insulating layer, and the first conductive layer covering the outer periphery of the first insulating layer and the electric conductor located on the outer surface of the first insulating layer. Thus, the stator coil according to the present disclosure has the corner portion with less start points for partial discharge while reducing loss.

DESCRIPTION OF EMBODIMENTS

Figure 1:
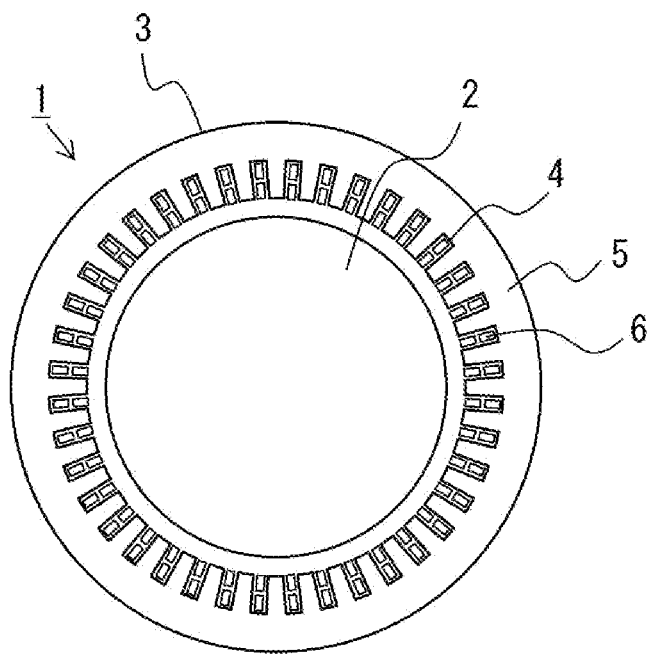
FIG. 1 is a schematic sectional view of a rotating electrical machine according to embodiment 1.

Hereinafter, a stator coil, a stator, and a rotating electrical machine according to an embodiment for carrying out the present disclosure will be described in detail with reference to the drawings. In the drawings, the same reference characters denote the same or corresponding parts.

Embodiment 1

FIG. 1 is a schematic sectional view of a rotating electrical machine according to embodiment 1. The rotating electrical machine of the present embodiment is, for example, a turbine electric generator. As shown in FIG. 1, the rotating electrical machine 1 is composed of a rotor 2 for generating a rotating magnetic field, and an annular stator 3 provided on the outer circumferential side of the rotor 2. The stator 3 is composed of a stator core 5 having slots 4 arranged in a circumferential shape, and a stator coil 6 inserted into the slots 4. The rotor 2 is provided rotatably relative to the stator 3, on the inner circumferential side of the stator 3. In the rotating electrical machine 1, induced current is generated in the stator coil 6 by the rotating magnetic field from the rotor 2.

Figure 2:
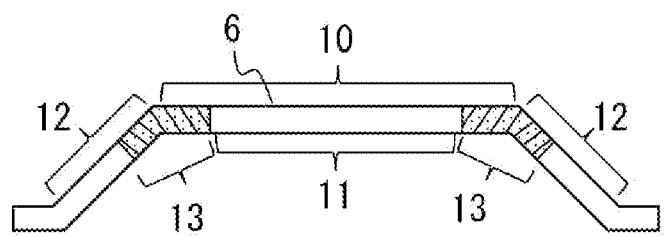
FIG. 2 is a schematic view of a stator coil according to embodiment 1.

FIG. 2 is a schematic view of the stator coil 6. As shown in FIG. 2, the stator coil 6 is formed by a slot portion 11 which is a part of a straight portion 10 having a straight shape and is inserted into the slot 4 of the stator core 5, and a coil end portion 12 exposed to the outside in the axial direction from the stator core 5 and bent outward in the radial direction. The stator coil 6 is wound back at the end of the coil end portion 12. The bent part from the slot portion 11 to the coil end portion 12 is referred to as a corner portion 13. A position where an insulating layer, a conductive layer, and the like are formed as described later is at the corner portion 13.

Figure 3:
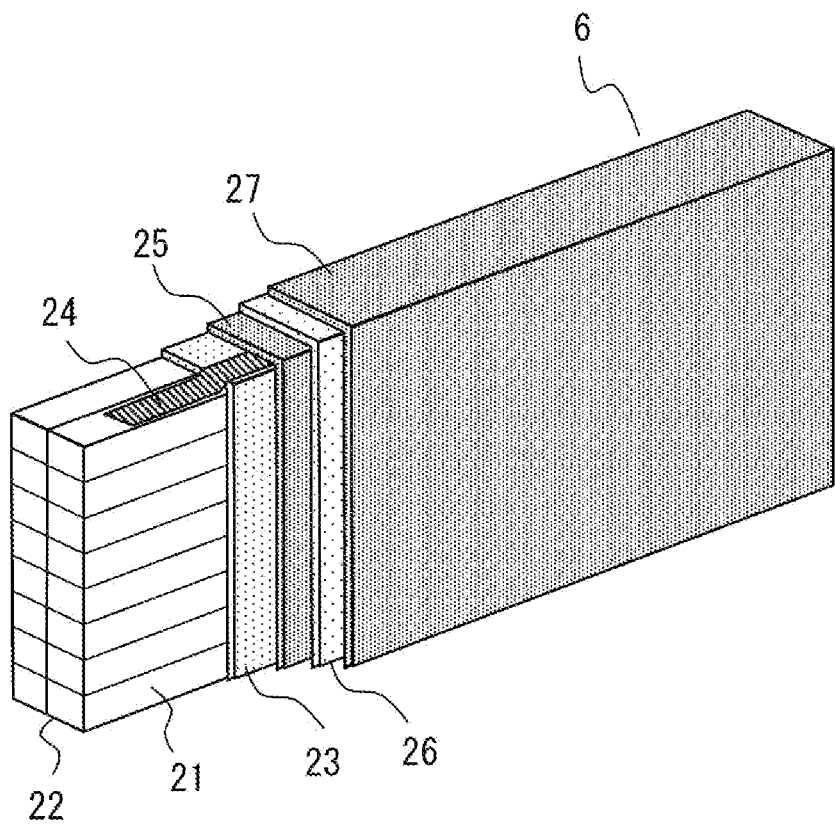
FIG. 3 is a perspective view of the stator coil according to embodiment 1.

FIG. 3 is a perspective view of the corner portion of the stator coil 6. In FIG. 3, the left side is the coil end portion side of the corner portion, i.e., the distal end side of the corner portion. In FIG. 3, although the corner portion is actually bent, the corner portion is shown in a state of not being bent, for illustrating the structure of the corner portion.

The stator coil 6 includes a conductor bar 22 formed by bundling strands 21 of copper or the like. The strand 21 is a copper wire having a rectangular sectional shape, and coated with an insulating coat of enamel or the like. The conductor bar 22 is formed by bundling the strands 21 in eight rows and two columns, for example. At the corner portion, the outer periphery of the conductor bar 22, excluding the coil end portion side of the corner portion, is covered by a first insulating layer 23. The first insulating layer 23 is formed by helically winding, for example, a mica tape around the conductor bar 22. The conductor bar 22 has, on the coil end portion side of the corner portion, a part not covered by the first insulating layer 23, and at this part, one end of an electric conductor 24 is electrically connected to the strand 21 at the uppermost side in the vertical direction of the conductor bar 22. At the part where the strand 21 and the electric conductor 24 are in contact with each other, the insulating coat for the strand 21 is removed. The electric conductor 24 is formed by a metal tape, or a metal tape having an adhesive layer, for example. The other end of the electric conductor 24 is placed on the outer surface of the first insulating layer 23. Preferably, the electric conductor 24 is connected to only one of the strands 21 of the conductor bar 22. This is because it is not preferable that the strands 21 are electrically connected to each other via the electric conductor 24. Therefore, preferably, the width of the electric conductor 24 is not greater than the width of the strand 21.

The outer periphery of the first insulating layer 23 and the electric conductor 24 located on the outer surface of the first insulating layer 23 are covered by a first conductive layer 25. In addition, the outer periphery of the first conductive layer 25 is covered by a second insulating layer 26. Further, the outer periphery of the second insulating layer 26 is covered by a second conductive layer 27. The first conductive layer 25 and the second conductive layer 27 are each formed by winding a conductive tape, for example. The conductive tape is formed by dispersing conductive carbon particles in a base material such as polyester or glass, for example. The second insulating layer 26 is formed by helically winding a mica tape, for example. In FIG. 3, for facilitating the understanding of the structure, only parts of the second insulating layer 26 and the second conductive layer 27 are shown, but in actuality, the second insulating layer 26 covers the entirety of the coil end portion, and the second conductive layer 27 covers the range including the slot portion 11 and the corner portion 13.

The first insulating layer 23 and the second insulating layer 26 are both formed by winding mica tapes. The first conductive layer 25 and the second conductive layer 27 are both formed by winding conductive tapes. Preferably, the surface resistivity of these conductive layers is in a range of $10^2 \Omega/\square$ to $10^5 \Omega/\square$.

Next, a manufacturing method for the stator coil of the present embodiment will be described.

Figure 4:
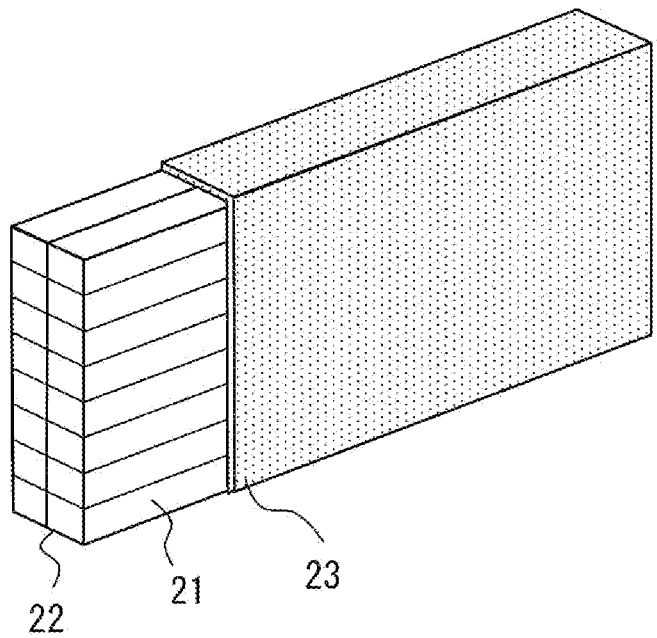
FIG. 4 is a schematic view illustrating a manufacturing process for the stator coil according to embodiment 1.

FIG. 4 to FIG. 9 are schematic views illustrating a manufacturing process for the stator coil. As shown in FIG. 4, the strands 21 which are copper wires having a rectangular sectional shape are bundled in eight rows and two columns, to prepare the conductor bar 22. Each strand 21 is coated with an enamel insulating coat. The first insulating layer 23 is formed around the outer periphery of the conductor bar 22. The first insulating layer 23 is formed by helically winding a mica tape around the conductor bar 22. The first insulating layer 23 is not formed on the coil end portion side of the corner portion of the conductor bar 22, and thus a part where the strands 21 are exposed is left.

Figure 5:
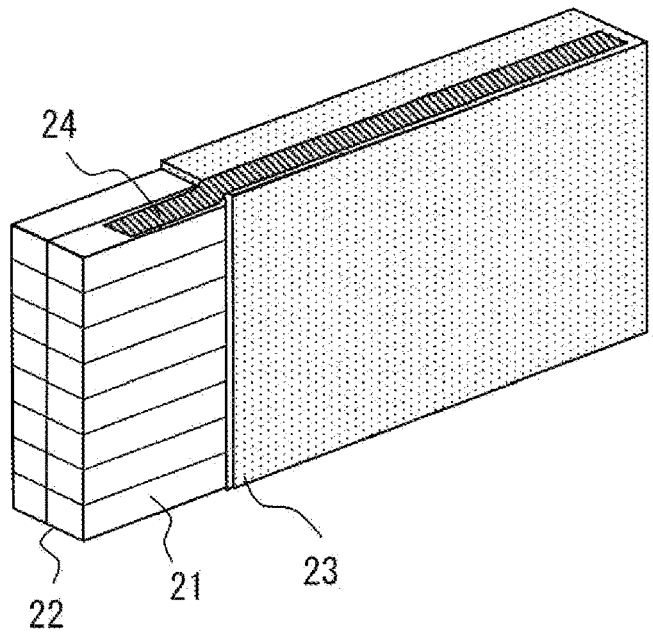
FIG. 5 is a schematic view illustrating the manufacturing process for the stator coil according to embodiment 1.

Next, as shown in FIG. 5, the electric conductor 24 is electrically connected to the strand 21 at the uppermost side in the vertical direction of the conductor bar 22. At this time, the insulating coat of the uppermost strand 21 at the part where the uppermost strand 21 and the electric conductor 24 come into contact with each other is removed in advance so as to ensure that the electric conductor 24 and the conductor bar 22 can be electrically connected. The electric conductor 24 is a metal tape having an adhesive layer, for example, and is adhered to the conductor bar 22 and the first insulating layer 23. It is noted that an end of the electric conductor 24 on a side opposite to the side connected to the conductor bar 22 is placed on the outer surface of the first insulating layer 23.

Figure 6:
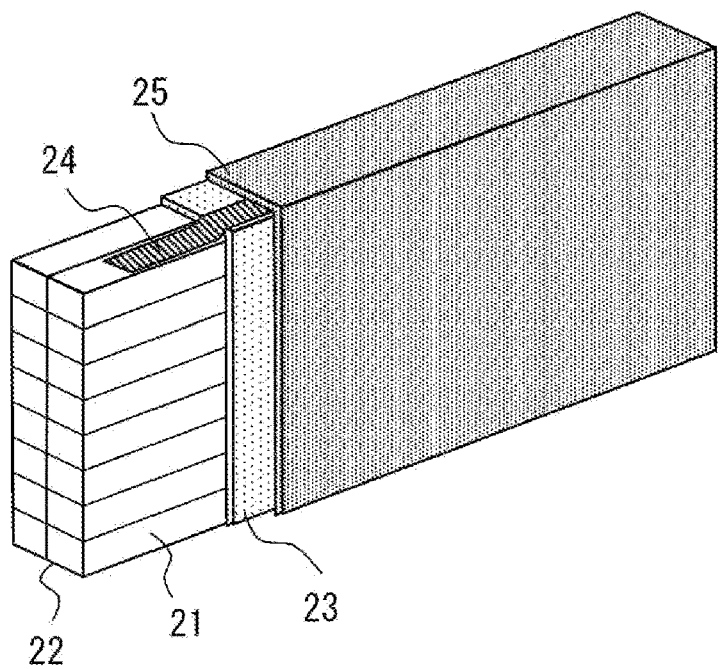
FIG. 6 is a schematic view illustrating the manufacturing process for the stator coil according to embodiment 1.

Next, as shown in FIG. 6, the outer periphery of the first insulating layer 23 and the electric conductor 24 is covered by the first conductive layer 25. At this time, the first conductive layer 25 is formed so as to cover only the outer periphery of the first insulating layer 23 and the electric conductor 24 located on the outer surface of the first insulating layer 23, and does not cover the part of the electric conductor 24 that is adhered to the conductor bar 22. The first conductive layer 25 is formed by helically winding a conductive tape.

Figure 7:
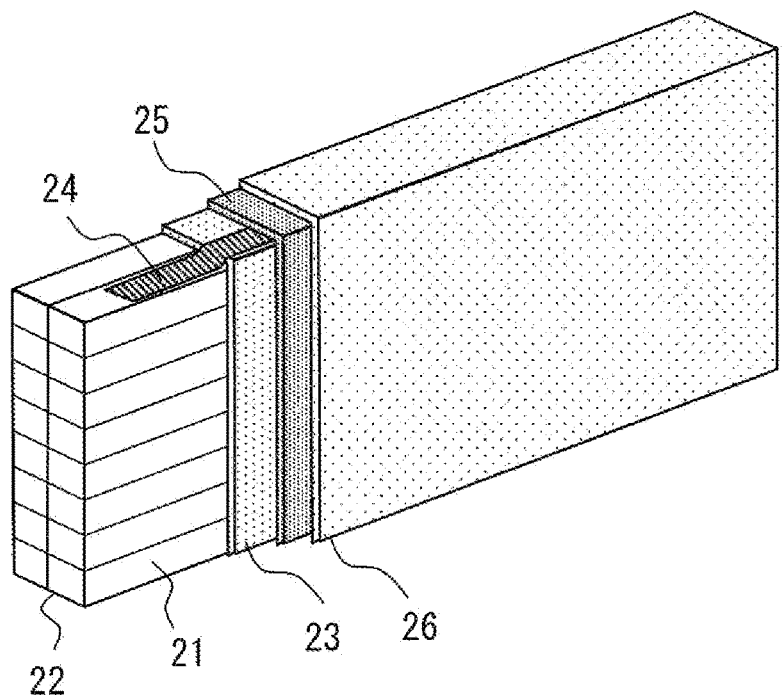
FIG. 7 is a schematic view illustrating the manufacturing process for the stator coil according to embodiment 1.

Next, as shown in FIG. 7, the outer periphery of the first conductive layer 25 is covered by the second insulating layer 26. The second insulating layer 26 is formed by helically winding a mica tape. In FIG. 7, the first insulating layer 23, the electric conductor 24, the first conductive layer 25, and the like formed under the second insulating layer 26 are shown in an exposed state, but in actuality, the second insulating layer 26 covers the entirety of the coil end portion.

Figure 8:
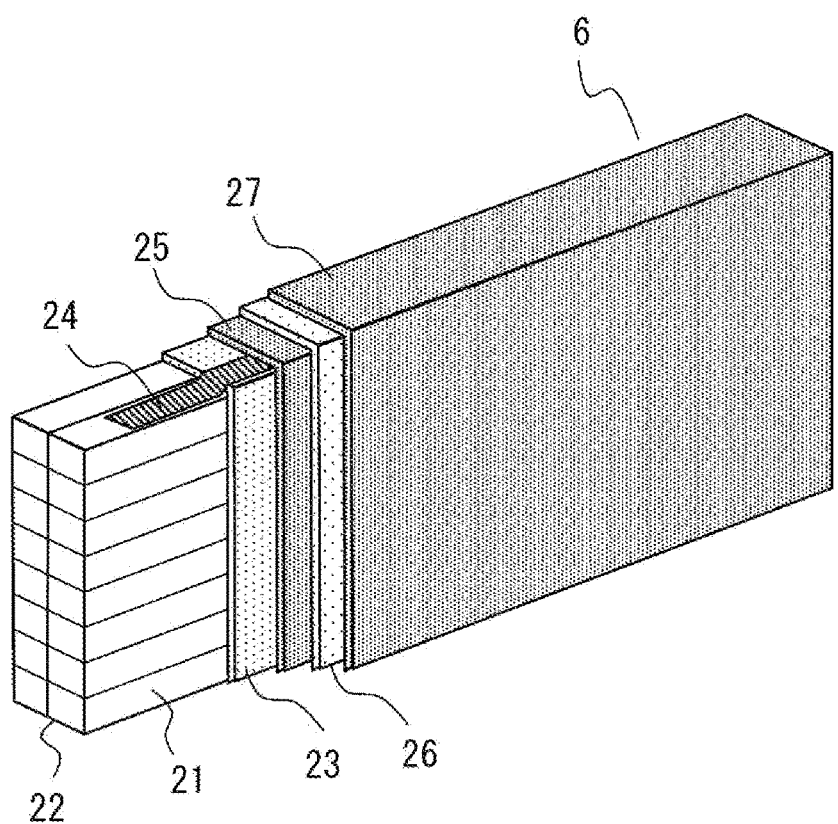
FIG. 8 is a schematic view illustrating the manufacturing process for the stator coil according to embodiment 1.

Finally, as shown in FIG. 8, the outer periphery of the second insulating layer 26 is covered by the second conductive layer 27. The second conductive layer 27 is formed by helically winding a conductive tape. In FIG. 8, the first insulating layer 23, the electric conductor 24, the first conductive layer 25, the second insulating layer 26, and the like formed under the second conductive layer 27 are shown in an exposed state, but in actuality, the second conductive layer 27 covers the range including the corner portion.

In the stator coil formed as described above, the conductor bar and the first conductive layer are electrically connected via the electric conductor at the corner portion. Therefore, occurrence of partial discharge at a part surrounded by the conductor bar and the first conductive layer can be inhibited. In addition, the first conductive layer does not form a helical current path, and therefore charge current does not flow helically. Further, since the first conductive layer is formed on the outer periphery of the electric conductor, even if a gap is formed at an edge part of the electric conductor, this part is surrounded by the conductor bar and the first conductive layer having the same potential, and therefore does not become a start point for partial discharge.

Although the disclosure is described above in terms of various exemplary embodiments, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 rotating electrical machine
2 rotor
3 stator
4 slot
5 stator core
6 stator coil
10 straight portion
11 slot portion
12 coil end portion
13 corner portion
21 strand
22 conductor bar
23 first insulating layer
24 electric conductor
25 first conductive layer
26 second insulating layer

The invention claimed is:

1. A stator coil having a conductor bar, the stator coil comprising, at a corner portion thereof:
    a first insulating layer covering an outer periphery of the conductor bar;
    an electric conductor having one distal end electrically connected to the conductor bar on a distal end side of the corner portion, and another distal end placed on an outer surface of the first insulating layer;
    a first conductive layer covering an outer periphery of the first insulating layer and the electric conductor located on the outer surface of the first insulating layer;
    a second insulating layer covering an outer periphery of the first conductive layer; and
    a second conductive layer covering an outer periphery of the second insulating layer,
    wherein the first conductive layer does not form a helical current path.
2. The stator coil according to claim 1, wherein
    a surface resistivity of the first conductive layer and a surface resistivity of the second conductive layer are in a range of $10^2 \Omega/\square$ to $10^5 \Omega/\square$.
3. The stator coil according to claim 1, wherein
    the electric conductor is a metal tape having an adhesive layer.
4. The stator coil according to claim 1, wherein
    the conductor bar is formed by bundling strands each having a rectangular sectional shape, and
    the electric conductor is connected to only one of the strands.
5. The stator coil according to claim 4, wherein
    a width of the electric conductor is not greater than widths of the strands.
6. A stator comprising:
    an annular stator core having slots arranged in a circumferential shape; and
    the stator coil according to claim 1, inserted into the slots.
7. A rotating electrical machine comprising:
    the stator according to claim 6; and
    a rotor provided rotatably relative to the stator, on an inner circumferential side of the stator.
8. A manufacturing method for a stator coil, comprising the steps of:
    covering an outer periphery of a conductor bar by a first insulating layer;
    electrically connecting one distal end of an electric conductor to the conductor bar, on a distal end side of a corner portion of the conductor bar, and placing another distal end of the electric conductor on an outer surface of the first insulating layer;
    covering an outer periphery of the first insulating layer and the electric conductor located on the outer surface of the first insulating layer, by a first conductive layer;
    covering an outer periphery of the first conductive layer by a second insulating layer; and
    covering an outer periphery of the second insulating layer by a second conductive layer,
    wherein the first conductive layer does not form a helical current path.

* * * * *